Jan. 16, 1962    K. E. DEVANTIER    3,016,969
EJECTING DEVICE FOR VEHICLES IN COLLISIONS
Filed Nov. 18, 1959    4 Sheets-Sheet 1
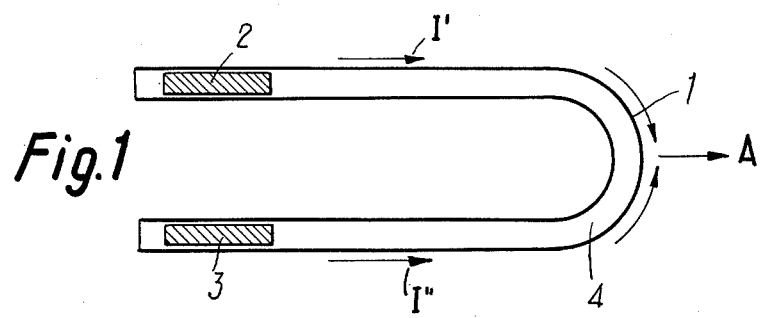
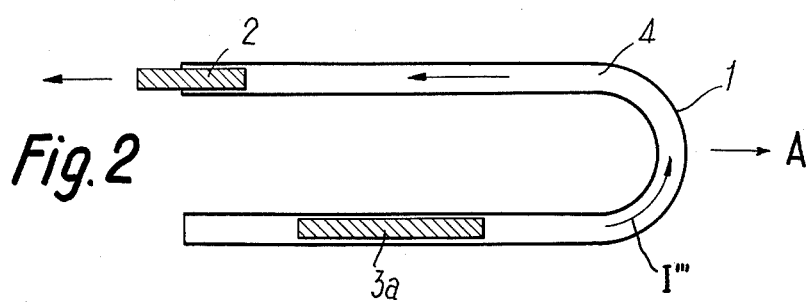
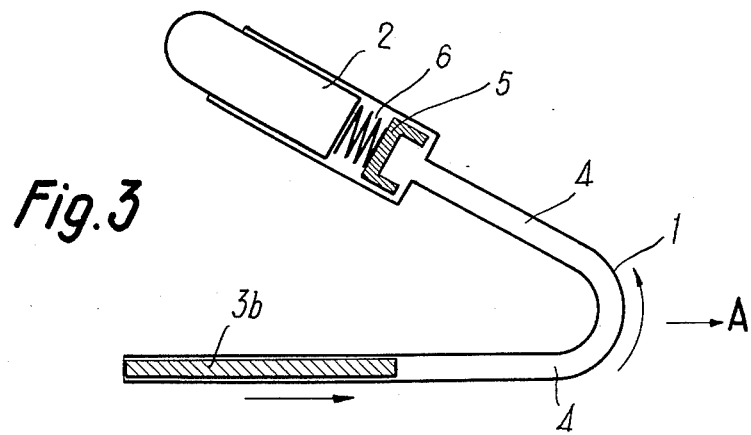
INVENTOR:
KARL EDMUND DEVANTIER
BY
Michael S. Striker
his ATTORNEY

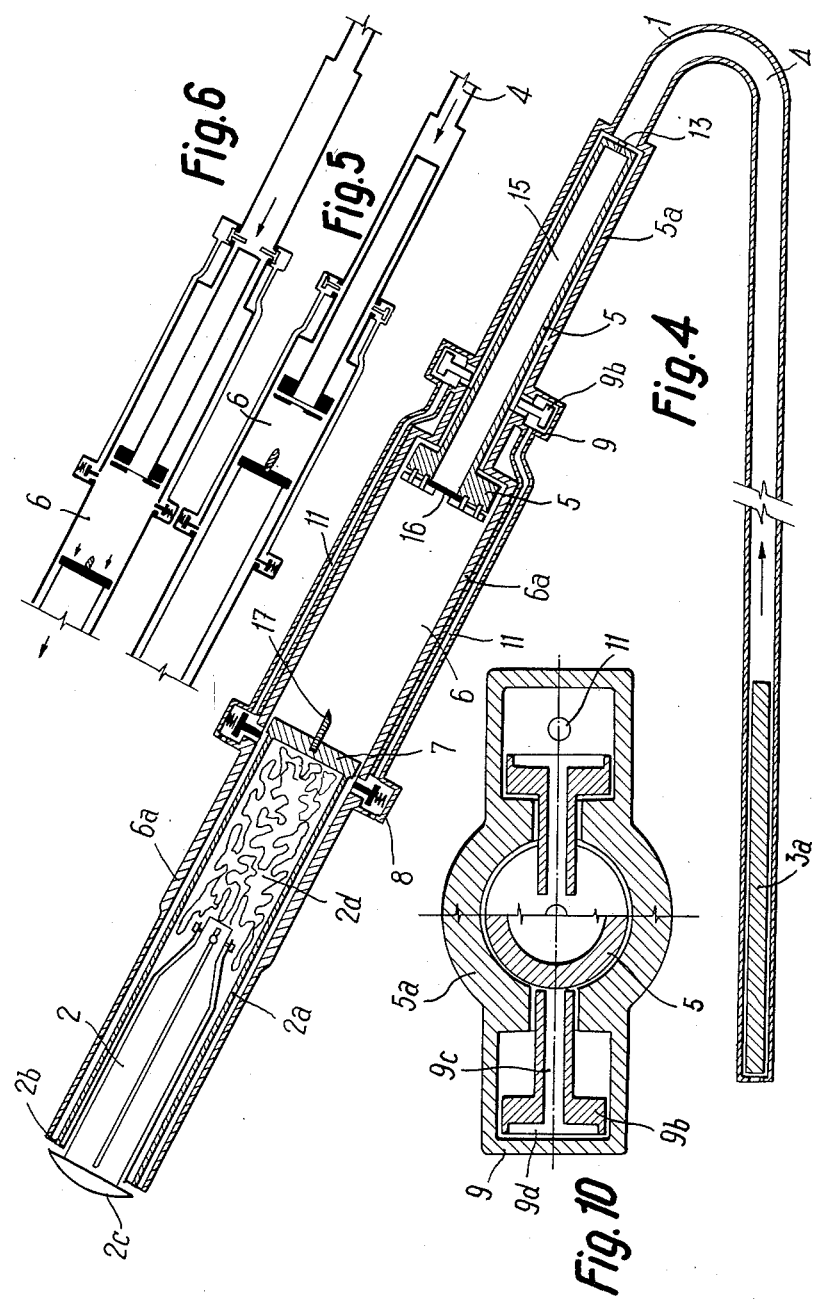

Jan. 16, 1962  K. E. DEVANTIER  3,016,969
EJECTING DEVICE FOR VEHICLES IN COLLISIONS
Filed Nov. 18, 1959  4 Sheets-Sheet 3
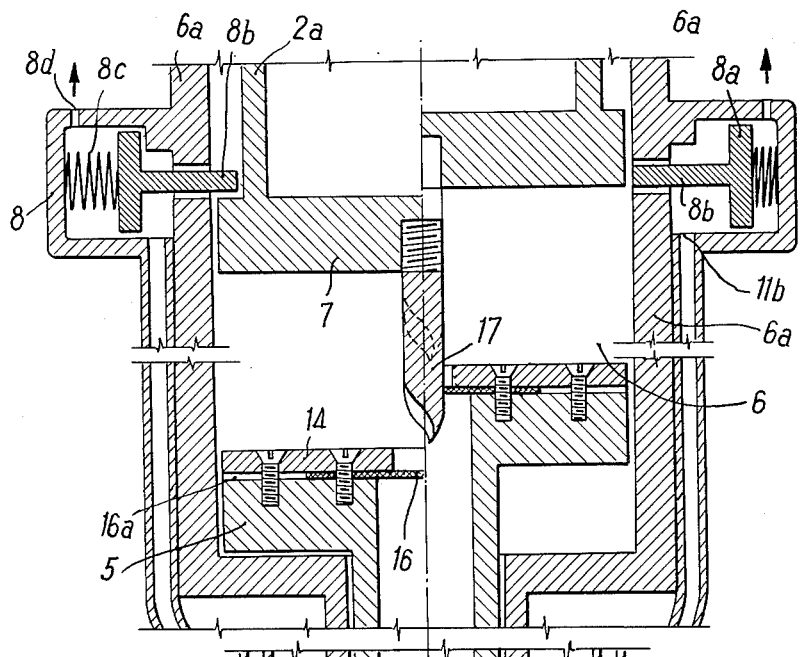
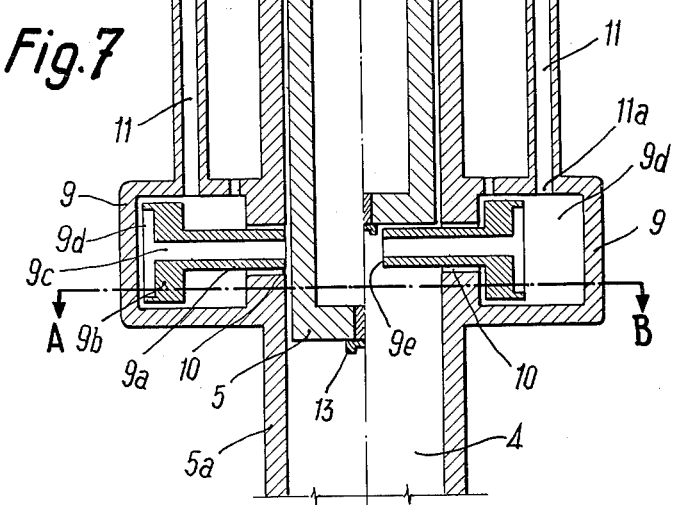
Fig.7
INVENTOR:
KARL EDMUND DEVANTIER
BY
his ATTORNEY

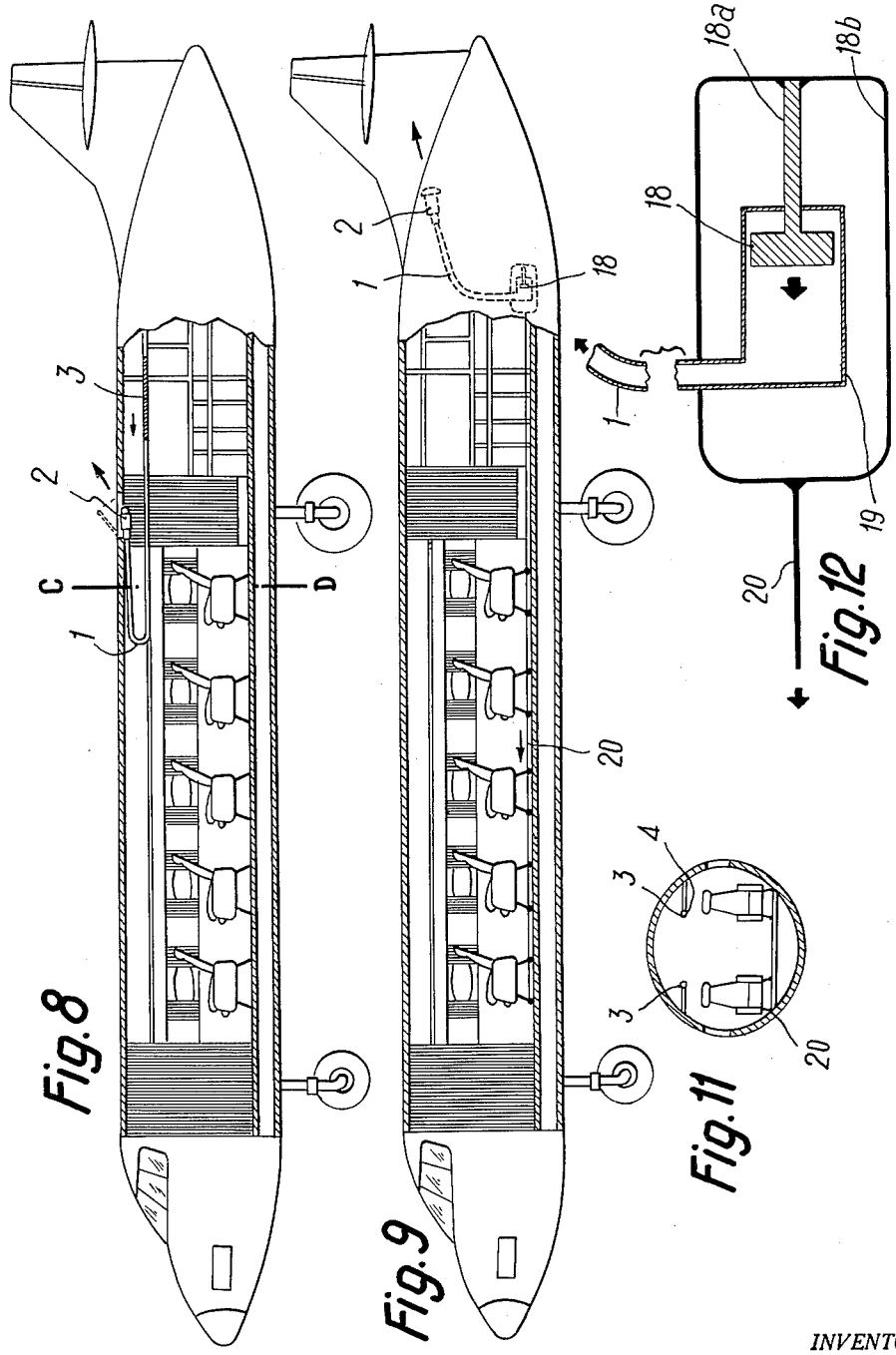

United States Patent Office 3,016,969
Patented Jan. 16, 1962

3,016,969
EJECTING DEVICE FOR VEHICLES IN
COLLISIONS
Karl Edmund Devantier, Puerta del Sol 6,
Madrid, Spain
Filed Nov. 18, 1959, Ser. No. 853,755
Claims priority, application Spain Nov. 20, 1958
25 Claims. (Cl. 180—82)

The present invention relates to an ejector device.

More particularly, the present invention relates to an ejector device for ejecting an object, such as an automatic radio transmitting device, from a rapidly moving vehicle in case of collision.

There exist automatic signalling devices, particularly small radio transmitters, which are carried by a vehicle, such as an aircraft, and which are designed to be ejected in case of accident. The transmitter then commences to broadcast a distress signal from a point spaced a short distance from the aircraft so as to allow rescue parties to locate the site of the accident. The transmitters per se are well known and present no particular problem; however, a number of difficulties have been encountered with the mechanism for ejecting the transmitter. For one thing, the ejection should take place in a direction opposite to that in which the aircraft was travelling so that the transmitter will not be smashed against the same obstacle with which the aircraft collided. This, then means that the forward momentum of the transmitter must first be equalized and then overcome so as to allow a rearward ejection. Furthermore, the ejection must take place very rapidly so that the transmitter is ejected even before the aircraft which, in the course of its collision, is undergoing enormous deceleration, comes to a complete halt. Also, the transmitter should be so ejected that it will not be exposed to fire or other calamity which may befall the aircraft.

Heretofore known devices have been found to be unsatisfactory. In those using explosive charges there is the acute danger of fire and the heat generated thereby. In ejector mechanisms using strong springs there is a time delay between the instant the springs are compressed and the instant they expand and become effective to eject the transmitter, particularly inasmuch as this time interval is stretched out until the forward momentum of the transmitter is reduced as the aircraft slows down and finally comes to rest. This delay is often fatal because by the time the aircraft has slowed down sufficiently, there is no way of knowing whether the egress through which the transmitter is to leave the aircraft is still unobstructed. In short, the ejection must take place at a time when the empennage of the aircraft is still in one piece, which is usually no longer the case if the ejection must await the time the aircraft is completely at rest.

There exist spring-actuated ejector devices for ejecting the pilot and the pilot seat in fighter aircraft, but here the only weight that must be counteracted is that of the pilot and the pilot seat, and the mechanism is not called upon to overcome the terrific forward momentum of the pilot and pilot seat. Therefore, the mechanism need supply only the relatively small force necessary to overcome the pilot weight, so as to eject him in a direction transverse to the direction of travel of the aircraft. Moreover, the mechanism is only used at a time when the aircraft is still in the air and not undergoing any exceptional change of velocity. It is clear, therefore, that the problems incident to pilot ejection are not those encountered in a mechanism for ejecting an object in a direction opposite to the direction of travel, at the time when this aircraft is being subjected to enormous deceleration.

It is therefore an object of the present invention to provide an ejector device which overcomes the drawbacks of heretofore known ejector devices.

It is another object of the present invention to provide an ejector device which is capable of ejecting an object from a vehicle in a direction generally opposite to that in which the vehicle is travelling when the vehicle is subjected to exceptionally high deceleration.

The objects of the present invention also include the provision of an ejector device which is of rugged construction, which can be built easily and which will perform reliably in time of emergency.

It is a further object of the present invention to provide an ejector device which can readily be installed in existing aircraft, sea or land vehicles.

It is also an object of the present invention to provide an ejector device which is capable of ejecting any desired object from an aircraft or land vehicle, but which is especialy adapted to eject a signalling device such as a radio transmitter which is automatically actuated upon ejection.

With the above objects in view, the present invention resides mainly in a device for automatically changing the direction in which moments of inertia arising during velocity changes of a vehicle are effective, which device comprises conduit means mounted on the vehicle and having two straight end sections which extend in the general direction of travel of the vehicle, these sections being placed in communication with each other by a connecting section which is arched convexly relative to the direction of travel, and two weights that are slidably and fluid-tightly arranged in the end sections, respectively. As a result, when a velocity change occurs, the moments of inertia of the weights will act against each other through a hydraulic medium contained in the conduit means.

More particularly, the present invention resides in a device for automatically changing the direction in which momenta present at high speeds of a vehicle are effective, which device comprises conduit means substantially as described above, and two unequal weights slidably and fluid-tightly arranged in the sections, respectively, so that upon the occurrence of exceptionally high deceleration, the momentum of the greater of the two weights will, through the hydraulic medium contained in the conduit means, overbear the momentum of the lesser weight, thereby causing the latter to move rearwardly, and it is this rearward movement of the last-mentioned weight which is utilized to eject the object from the vehicle in rearward direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic diagram showing the principle of operation on which the present invention is based;

FIG. 2 is a schematic diagram similar to that of FIG. 1 but showing a carrying forward of the principle involved;

FIG. 3 is a schematic diagram showing the principle involved as applied to an ejector device according to the present invention;

FIG. 4 is a sectional view of one embodiment of an ejector device according to the present invention, the parts being shown in their normal rest position;

FIG. 5 is a simplified fragmentary view of the embodiment of FIG. 4, showing the parts in the position they occupy at the start of the ejection process;

FIG. 6 is a view similar to FIG. 5 but showing the parts at the completion of the ejection process;

FIG. 7 is a sectional view of a part of the embodiment referred to above shown on an enlarged scale, the right and left hand halves of the figures showing the same parts in different operative positions;

FIG. 8 shows an aircraft incorporating an ejector device according to the present invention;

FIG. 9 shows an aircraft incorporating a modified embodiment of an ejector device according to the present invention;

FIG. 10 is a sectional view taken on line A—B of FIG. 7;

FIG. 11 is a sectional view taken on line C—D of FIG. 8; and

FIG. 12 is a simplified illustration of the embodiment shown in FIG. 9.

Referring now to the drawings, and to FIG. 1 thereof in particular, there is shown a schematic diagram in which "A" represents the direction of travel of the vehicle, the term "vehicle" as used throughout the instant specification and claims, being deemed to include any land, sea or airborne craft which is capable of travelling at high speeds. The figure shows a heavy steel conduit means 1 having two straight end sections which extend in the general direction "A," i.e., either parallel as shown or at any acute angle to this direction. The end sections are open at their rearward ends and are placed in communication with each other at their forward ends by a curved connecting section which is arched convexly relative to the direction "A."

Two weights 2 and 3 are slidably and fluid-tightly arranged in the end sections in the manner of pistons, and the space 4 between them is filled with a hydraulic fluid such as oil.

When the vehicle to which the conduit mean 1 is connected is in motion, the weight 2 has a forward momentum indicated by the arrow I', and the forward momentum of the weight 3 is indicated by the arrow I". When the weights are equal to each other they will, perforce, have equal momenta. If the vehicle is subjected to deceleration, these two moments will act upon each other through the intermediary of the hydraulic fluid in the space 4, so that the two weights will not move relative to each other, no matter how severe the deceleration.

In FIG. 2 the weight 3a is shown as being greater than the weight 2, and this means that the momentum I''' of the weight 3a is greater than that of weight 2. Therefore, upon deceleration, the momentum of the weight 3a will not only equalize but will overbear that of weight 2, and since the momentum of each weight is proportional to the velocity, the higher the velocity of the vehicle, the greater will be the difference between the momenta of the two weights.

FIG. 3 shows the object 2 which is to be expelled as being in the form of a float containing a signalling device such as radio transmitter. The details of this transmitter are not shown inasmuch as it is of conventional construction for which no claim is made here. Suffice to say, that the transmitter is of the type which commences to operate automatically upon ejection. Also shown is a ram 5 which is slidably arranged in the end section of the conduit means 1, this ram constituting a cylinder having an effective cross-sectional area greater than that of the space 4. Upon deceleration, the ram 5 will move relative to the conduit means 1 more slowly than the weight 3b, but this is offset by the increased rearward pressure which the ram 5 exerts on the air chamber 6 so as to compress the air between the ram 5 and the object 2, thereby to expel the latter. If desired, a coil spring can be interposed between the ram 5 and the object 2, and this spring will be compressed during the backward movement of the ram.

Referring now to FIG. 4, the same shows the object more detailedly as comprising a generally bottle-shaped container 2 housing a radio transmitter, which container is arranged within an ejector capsule 2a having an open mouth portion 2b and a closed bottom 7. Both the container 2 and the capsule 2a are cylindrical. The bottom of the container 2 is open and has arranged on it a spherical segment 2c the outside diameter of which is greater than the diameter of the container so that it overlies the edge of the mouth portion 2b of the capsule 2a. The capsule further houses a parachute 2d which serves as an air brake.

When the capsule is ejected, in a manner to be described below, the capsule 2a is pressed against the edge of the segment 2c. When the capsule is then braked, the container 2a is withdrawn from the capsule and pulls with it the parachute 2d. Additionally, an inflatable balloon may be provided.

For a detailed description of the interaction between the various parts of the capsule, reference may be had to my co-pending application Serial No. 640,113.

The capsule 2a is slidably arranged within the enlarged cylindrical portion 6a, from which it is expelled by a gaseous medium under pressure, as is explained below.

FIG. 4 shows the larger of the two weights, namely, the weight 3a, as being in the form of a long rod of heavy metal. In practice, the end section of the conduit receiving this rod will be sufficiently long to allow the rod to move a distance of two or more meters in the direction of travel of the vehicle. The pressure which this rod is thus capable of exerting upon deceleration of the vehicle is very large, and depends on the speed at the time of impact. The hydraulic fluid in space 4 then acts on the piston ram 5 which has a greater effective area than has the rod 3a, so that in accordance with well-known principles of hydraulics, the total force acting on the ram is increased while the speed is decreased.

At the moment of collision of the vehicle with another object which causes the vehicle to decelerate at an exceptionally high rate, the following will take place, as shown in FIG. 5: the ram will be moved rearwardly in the manner described above, while the capsule 2 will move forwardly under the impact of its own momentum. The air in space 6 will thus be compressed from both sides, until a point is reached at which the forward momentum of the capsule has been fully spent in the work done in compressing the air. The capsule 2 will therefore be stopped. However, the ram 5 will continue to be moved rearwardly so that the air chamber is physically displaced rearwardly. This displacement causes the capsule 2 to move rearwardly until the position depicted in FIG. 6 is reached. In this way, not only has the momentum of the capsule 2 been overcome, but the capsule is already given an impetus in rearward direction.

The position shown in FIG. 6 is that at which the ram 5 has completed its maximum travel under the influence of the reversed momentum of the weight 3a. Consequently, there is no more energy available to move the ram 5 rearwardly or even to hold the ram from now moving forward under the influence of the compressed air in chamber 6. Accordingly, suitable blocking means are provided for preventing this forward movement, and these blocking means are in the form of slidably arranged detents the construction and operation of which are more detailedly shown in FIGS. 7 and 10.

The blocking means become effective once the ram has moved backward a predetermined distance under the influence of the weight 3a, namely, to the position shown in FIG. 6, and prevent forward movement of the ram from this point on. Consequently, the expansion of the compressed air trapped in chamber 6 acts on the bottom 7 of the capsule and causes the latter to be moved rearwardly, thereby ejecting the capsule through the open end of the conduit.

According to the present invention additional blocking means are provided for preventing ejection of the capsule every time the vehicle undergoes a relatively minor deceleration such as will occur during normal operation. Here it will be noted that upon mild deceleration, the capsule will move forwardly somewhat so as to compress the air in chamber 5. This compression, however, will serve to damp the movement of the capsule, and as soon as a condition of equilibrium is attained, the air will expand and return the capsule to the position shown in FIG. 4. Moreover, the additional blocking means prevent ejection of the capsule merely upon acceleration of the vehicle when the inertia of the capsule would tend to hold it in place while the conduit accelerates with the vehicle in the direction of travel.

The blocking means for preventing undesired ejection of the capsule are interconnected with the first-mentioned blocking means in such a manner that the capsule will be freed for ejection only when the ram 5 has reached a position in which the first-mentioned blocking means have become effective to prevent forward movement of the ram. Since this last-mentioned condition is attained only when the vehicle is subjected to catastrophically high deceleration, the capsule will remain in the ejector device until the critical moment arises.

The detents, of which there are preferably at least two arranged diametrically opposite each other, each has a head portion 9b and a stem portion 9a and is located in a radial bore 10 communicating with the end section 5a within which the ram 5 slides. These bores are covered by the ram 5 until it reaches the position shown in FIG. 6, whereupon the bores 10 are uncovered, as are the openings 9e of passages 9c formed in the stems 9a of the detents. This allows hydraulic fluid to flow into the head portions 9d of chambers 9 in which the detents are formed as piston surfaces of relatively large effective areas, so that the detents are moved inwardly into the position shown at the right of FIG. 7, thereby preventing the forward movement (downwardly, as viewed in FIG. 7), of the ram 5.

The second blocking means comprise two detents each having a head portion 8a and a stem portion 8b. These detents, of which there also are preferably at least two arranged diametrically opposite each other, are located in chambers 8 and are spring-biased inwardly by springs 8c. The chambers 8 are in communication with the chambers 9 by way of by-pass conduits 11 which extend in the direction of the end section 5a, and it will be seen that after the detents 9a, 9b have moved to their blocking position, hydraulic fluid will flow through the passages 9c and by-pass conduits 11 to the underside of the detent heads 8a. The underside acts as a piston surface and the pressure exerted by the incoming hydraulic fluid is sufficient to overcome the action of the springs 8c, so that the detents 8a, 8b will be moved outwardly while air in the chambers 8 is vented at 8d, thereby disengaging the flange of the bottom 7 and freeing the capsule 2 for ejection. In this way, the detents constituting the blocking means for the ram 5 serve as valve means which control the blocking means for the capsule 2.

Once the detents 8a, 8b are retracted, the compressed air trapped in chamber 6 can expand and thereby eject the capsule 2.

According to another feature of the present invention, the ram 5 is hollow and contains a gaseous fluid medium 15 under pressure, such as compressed air or carbon dioxide. That end of the ram which is directed toward the capsule 2 is frangible, and piercing means are provided for piercing the frangible end so that the gaseous fluid medium under pressure is allowed to flow into the air chamber 6 and to assist in the ejection of the capsule 2.

In the illustrated embodiment, the hollow interior of the ram 5 at its forward end, i.e., the end against which the hydraulic fluid acts under the influence of the weight 3, is formed with a filling opening 13 which is tightly closed after the gaseous medium has been charged into the ram 5 under pressure. The other end of the ram is closed off by a frangible closure plate 16 made of any suitable material such as nylon, and this plate is held in place by means of an annular retaining plate 14 which is screwed into the enlarged head of the ram by means of flat-headed screws. If desired, the space 16a can be occupied by a suitable sealing ring (not shown) of rubber or other sealing material. The inner diameter of the annular retaining plate 14 is preferably smaller than the hollow interior of the ram.

The closure plate, if made of nylon, is well suited for withstanding high mechanical stresses. At the same time, it can be cut relatively easily, and this characteristic is made use of in that a piercing means in the form of a cutter 17 is provided, against which the closure plate is brought to bear. The cutter 17 is a short steel tube attached to the bottom of the capsule 2. The free end of the tube is cut off at an angle and the thus-formed oval edge is ground to knife-sharpness. In this way, the nylon closure plate will be punctured when the ram 5 has almost reached its most forward position. The cutter 17 makes a round hole which is temporarily closed off by the cutter itself but which is opened as soon as the capsule commences its rearward movement.

FIG. 8 shows the ejector device mounted on an aircraft. Here the large counterweight 3 is a thin heavy rod and the end section containing this rod can, in the case of a passenger aircraft, be accommodated in the longitudinally extending edge of the overhead baggage rack or net. The other end section, namely, the end section containing the capsule 2, can be directed through the roof of the cabin, as shown in solid lines, or, preferably, through the empennage or tail section.

It has been noted that in very rapidly travelling vehicles, particularly jet aircraft, the entire craft is bent and broken almost at the instant of impact, so that the conduit end section containing the counterweight rod 3 may be bent before this rod has had an opportunity to complete its run. This is so because the path of travel of the rod should not be shorter than approximately 2.5 to 3 meters; the rod itself should be at least 2 meters long and have a diameter of 4 to 5 centimeters so as to produce the pressure per unit area necessary to achieve the desired result. The specific gravity of the rod 3 is at least 8.

According to another embodiment of the present invention the arrangement is such that the counterweight need travel but about one-tenth of the distance mentioned above, i.e., about 30 centimeters. To this end, the counterweight has a relatively large effective area, and must, of course, be sufficiently massive. In practice, the weight required would be prohibitively excessive, in that it would render the entire ejector device so heavy as to make it impractical for use in aircraft. Therefore, as part of the weight use is made of the cargo; in the case of passenger aircraft, it is the seats which are motion-transmittingly connected to the counterweight so that the weight of not only the seats themselves but also the weight of the passengers is utilized.

Such an arrangement is shown in FIGS. 9, 11 and 12 in which the counterweight piston 18 which slides in end section 19 is connected to flexible tension cable 20 by way of a piston rod 18a and a rigid yoke 18b. The cable is attached to the seats, so that in the event of exceptionally high deceleration, the forward momentum of the seats with or without passengers is transmitted to the counterweight piston 18 which then actuates a ram 5 in the manner described above.

It will be noted that by using a flexible transmission cable for connecting the counterweight to the main portion of the load, premature bending or breaking of a stiff rod and tubing is avoided. At worst, the cable may snap after the counterweight piston 18 has been driven home, but by that time the ejector device has accomplished its mission and is of no further use anyway.

While the above illustrative embodiments of an ejector mechanism have been described with particular application to aircraft, it will be understood that their use is not so limited. As set forth earlier, the term "vehicle" is intended to include all types of land, air or sea machines, including rockets and missiles. If used for land vehicles such as automobiles, the device is particularly useful when employed in cars or trucks travelling along little frequented roads. The ejectors may then, in case of collision, eject a transmitter which broadcasts a predetermined distress signal, which are picked up by receivers at service stations in the area. These service stations are generally in telephonic communication with each other so as to facilitate the calculations necessary to pin-point the origin of the distress signal.

Also, it should be borne in mind that when the ejector device according to the present invention is intended for use with land vehicles which move at a speed which is but a fraction of that of aircraft, the parts may be correspondingly simpler and less strong.

Furthermore, the use of the ejector is not limited to ejecting radio transmitters or other signalling devices, but may be employed to jettison other articles, even those much heavier than small transmitters, such as flight instruments or valuable cargo.

It will be understood that each of the elements described above, or two or more together, may also find a useful application in other types of devices for automatically changing the direction in which momenta arising during velocity changes of a vehicle are effective, which devices differ from the types described above.

While the invention has been illustrated and described as embodied in an ejector device for use on vehicles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A device for automatically changing the direction in which momenta present at high speed of a vehicle are effective, said device comprising, in combination: conduit means mounted on the vehicle and having two straight end sections which extend in the general direction of travel of the vehicle, said end sections being placed in communication with each other by a connecting section which is curved convexly relative to said direction of travel; and a first and a lesser second weight slidably and fluid-tightly arranged in said end sections, respectively, whereby upon the occurrence of exceptionally high deceleration, the momenta of said weights will counteract each other through a hydraulic medium contained in said conduit means and said second weight will be displaced in a direction counter to the general direction of travel of the vehicle.

2. A device for automatically changing the direction in which momenta present at high speed of a vehicle are effective, said device comprising, in combination: conduit means mounted on the vehicle and having two straight end sections which extend substantially parallel to the direction of travel of the vehicle, said end sections being placed in communication with each other by a connecting section which is curved convexly relative to said direction of travel; and a first weight and a lesser second weight slidably and fluid-tightly arranged in said end sections, respectively, whereby upon the occurrence of exceptionally high deceleration, the momenta of said weights will counteract each other through a hydraulic medium contained in said conduit means and said second weight will be displaced in a direction counter to the general direction of travel of the vehicle.

3. A device for automatically changing the direction in which momenta present at high speed of a vehicle are effective, said device comprising, in combination: conduit means mounted on the vehicle and having two straight end sections which form an acute angle with the direction of travel of the vehicle, said end sections being placed in communication with each other by a connecting section which is curved convexly relative to said direction of travel; and a first weight and a lesser second weight slidably and fluid-tightly arranged in said end sections, respectively, whereby upon the occurrence of exceptionally high deceleration, the momenta of said weights will counteract each other through a hydraulic medium contained in said conduit means and said second weight will be displaced in a direction counter to a general direction of travel of the vehicle.

4. A device for automatically changing the direction in which momenta present at high speed of a vehicle are effective, said device comprising, in combination: conduit means mounted on the vehicle and having two straight end sections which extend in the general direction of travel of the vehicle, said end sections being placed in communication with each other by a connecting section which is curved convexly relative to said direction of travel; and two weights slidably and fluid-tightly arranged in said end sections, respectively, one of said weights being greater and the other of said weights being lesser, said lesser weight consisting of at least one part, whereby upon the occurrence of exceptionally high deceleration, the momentum of the greater of said two weights will, through a hydraulic medium contained in said conduit means, overbear the momentum of the lesser of said two weights, thus causing the latter to move in a direction generally opposite to the direction of travel of the vehicle so that said one part is ejected from the respective end section.

5. A device for automatically changing the direction in which momenta present at high speed of a vehicle are effective, said device comprising, in combination: conduit means mounted on the vehicle and having two straight end sections which extend in the general direction of travel of the vehicle, said end sections being placed in communication with each other by a connecting section which is curved convexly relative to said direction of travel; and two unequal weights slidably and fluid-tightly arranged in said end sections, respectively, whereby upon the occurrence of exceptionally high deceleration, the momentum of the greater of said two weights will, through a hydraulic medium contained in said conduit means, overbear the momentum of the lesser of said two weights, thus causing the latter to move in a direction generally opposite to the direction of travel of the vehicle and to be ejected out of the open end section in which it is arranged.

6. A device for automatically ejecting an object from a vehicle in a direction generally opposite to that in which the vehicle is travelling when the vehicle is subjected to exceptionally high deceleration, said device comprising, in combination: conduit means mounted on the vehicle and having two straight end sections which extend in the general direction of travel of the vehicle, said end sections being placed in communication with each other by a connecting section which is curved convexly relative to said direction of travel; two unequal weights each having at least a portion thereof slidably and fluid-tightly arranged in said end sections, respectively; and means for so positioning the object to be ejected that when the lesser of said two unequal weights is moved rearwardly, it will cause the object to be ejected in a direction generally opposite to that in which the vehicle is travelling, whereby upon the occurrence of exceptionally high deceleration, the momentum of the greater of said two weights will, through a hydraulic medium contained in said conduit means, overbear the momentum of said lesser weight, thereby causing said lesser weight to move rearwardly and thus eject the object.

7. A device as defined in claim 6, wherein the object to be ejected is a signalling device.

8. A device as defined in claim 7 wherein said signalling device is a radio transmitter.

9. A device as defined in claim 6 wherein said end sections have different effective cross-sectional areas and wherein the lengths of said end sections and the mass of said weights are so selected that upon occurrence of exceptionally high deceleration, said weights will move at different speeds and throughout different distances.

10. A device as defined in claim 6 wherein said object is a hollow cylinder capable of floating on water, wherein the greater of said weights is an elongated rod of high specific gravity, and wherein the end section in which said rod is arranged is sufficiently long to allow said rod to travel a distance equal to at least thirty times the diameter of said rod.

11. A device as defined in claim 10 wherein the specific gravity of said rod is at least 8.

12. A device as defined in claim 6 wherein the greater of said weights comprises (a) a piston of relatively large diameter mounted in the end section in which it is arranged for movement throughout a relatively short distance, and (b) the cargo of said vehicle, said cargo being motion-transmittingly connected to said piston.

13. A device as defined in claim 12 wherein said piston and cargo are motion-transmittingly connected to each other by cable means.

14. A device as defined in claim 13 wherein said cargo is constituted by seats of the vehicle adapted to receive passengers thereof, whereby the weight of passengers occupying said seats is part of said greater weight.

15. A device as defined in claim 12 wherein said piston is so dimensioned that its path of travel upon the occurrence of exceptionally high deceleration is between one to two times the diameter of said piston.

16. In a vehicle, an ejector device comprising, in combination: conduit means mounted on the vehicle and having two straight end sections which extend in the general direction of travel of the vehicle, said end sections being open at their rear ends and being placed in communication with each other at their forward ends by a connecting section which is curved convexly relative to said direction of travel; and two unequal weights associated with said conduit means, the greater of said weights being slidably and fluid-tightly arranged in one of said end sections and the lesser of said weights comprising a ram and an object to be ejected, said ram being slidably and fluid-tightly arranged in the other of said end sections and said object being adapted to be ejected by the action of said ram when the vehicle is subjected to exceptionally high deceleration which causes the momentum of said greater weight, through a hydraulic medium in said conduit means, to overbear the momentum of said ram and object, whereupon said object is ejected through the open rear end of said other end section.

17. In a vehicle, an ejector device comprising in combination: conduit means mounted on the vehicle and having two straight end sections which extend in the general direction of travel of the vehicle, said end sections being open at their rear ends and being placed in communication with each other at their forward ends by a connecting section which is curved convexly relative to said direction of travel; and two unequal weights associated with said conduit means, the greater of said weights being slidably and fluid-tightly arranged in one of said end sections and the lesser of said weights comprising a ram and an object to be ejected, each being slidably and fluid-tightly arranged in the other of said end sections, said ram and object being spaced from each other and forming an air chamber between themselves, whereby when the vehicle is subjected to exceptionally high deceleration which causes the momentum of said greater weight, through a hydraulic medium in said conduit means, to overbear the momentum of said lesser weight, said ram is moved rearwardly while said object moves forwardly, thereby compressing the air in said air chamber and causing said object to be ejected through the open rear end of said other end section.

18. A device as defined in claim 17 further comprising blocking means for preventing the forward movement of said ram once it has moved backward a predetermined distance under the influence of said greater weight.

19. A device as defined in claim 17 further comprising first blocking means for preventing the forward movement of said ram once it has moved backward a predetermined distance under the influence of said greater weight, and second blocking means for preventing the ejection of said object, said second blocking means being operatively associated with said first blocking means for freeing said object for ejection as soon as said ram has moved backward said predetermined distance.

20. A device as defined in claim 19 wherein said second blocking means includes a hydraulically actuatable blocking member adapted to be moved to retraced position wherein said object is free to be ejected, and wherein said first blocking means form valve means in communication with said blocking member for admitting hydraulic fluid thereto when said ram has moved backward said predetermined distance.

21. A device as claimed in claim 20 wherein said second blocking means and said valve means are placed in communication with each other by a by-pass conduit which extends in the direction of said other end section.

22. A device as defined in claim 18 wherein said ram is hollow and contains a gaseous fluid medium under pressure, wherein that end of said ram which is directed toward said object is frangible, and wherein piercing means are provided for piercing said frangible end of said ram when the same moved backward said predetermined distance in which said blocking means are effective to prevent forward movement of said ram, whereby the gaseous fluid medium under pressure is allowed to flow into said air chamber so as to assist in the ejection of said object.

23. A device as defined in claim 22 wherein said piercing means are carried by said object.

24. A device as defined in claim 23 wherein said frangible end of said ram is constituted by a nylon plate.

25. A device for automatically changing the direction in which moments of inertia arising during velocity changes of a vehicle are effective, said device comprising, in combination, conduit means mounted on the vehicle and having two end sections at least one of which extends in the general direction of travel of the vehicle, said end sections being placed in communication with each other by a connecting section; a first weight having at least a portion thereof slidably and fluid-tightly arranged in said one end section; and a lesser second weight having at least a portion thereof slidably and fluid-tightly arranged in the other end section, whereby when a velocity change occurs, the moments of inertia of said weights will act against each other through a fluid medium contained in said conduit means and the second weight will be displaced with respect to said other end section.

References Cited in the file of this patent

UNITED STATES PATENTS

| | | |
|---|---|---|
| 1,183,644 | Hill | May 16, 1916 |
| 2,149,808 | Ellis | Mar. 7, 1939 |
| 2,380,587 | Fenton | July 31, 1945 |
| 2,470,783 | Mead | May 24, 1949 |
| 2,831,967 | Bayze | Apr. 22, 1958 |
| 2,959,776 | Morrah | Nov. 8, 1960 |